UNITED STATES PATENT OFFICE.

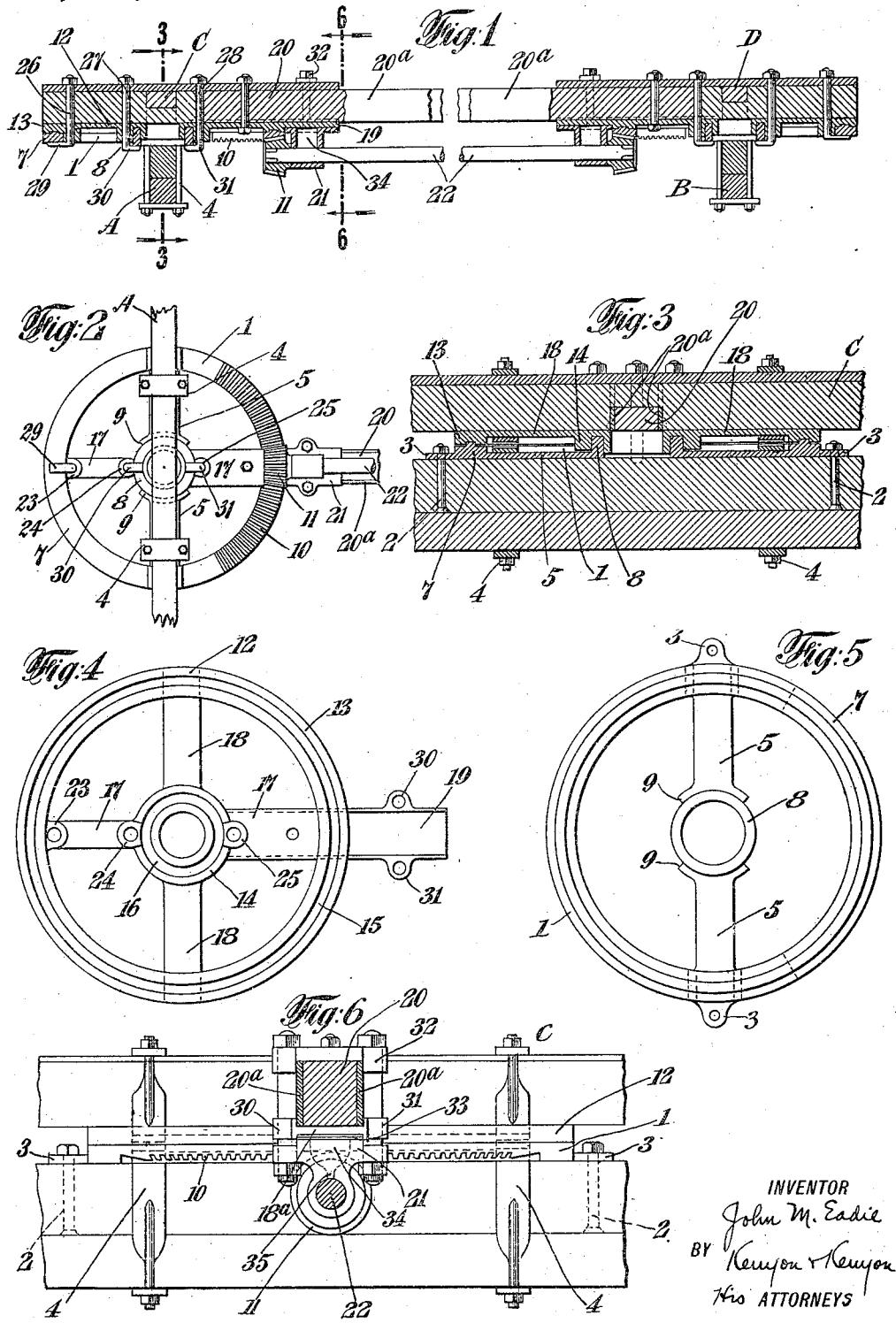

JOHN M. EADIE, OF NEW YORK, N. Y.

STEERING AND TURNING DEVICE FOR VEHICLES.

1,272,026.  Specification of Letters Patent.  Patented July 9, 1918.

Application filed October 16, 1915. Serial No. 56,207.

*To all whom it may concern:*

Be it known that I, JOHN M. EADIE, a citizen of the Dominion of Canada, and a resident of the city, county, and State of New York, have invented certain new and useful Improvements in Steering and Turning Devices for Vehicles, of which the following is a specification.

My invention relates to steering and turning devices for vehicles and is especially designed for use in connection with vehicles having short turning gear,—that is, two turning axles mechanically connected together, so that, when one turns in one direction, the other turns in the opposite direction.

More especially, my invention relates to improvements in the structure of vehicle gear such as that illustrated in my Letters Patent of the United States No. 922,757 granted May 25, 1909, for steering and turning device for vehicles and No. 1,028,866 granted June 11, 1912, for turning devices for vehicles.

A device of this character, to be successful, must contain means for positively controlling the turning motion of the front and rear axles of the vehicle simultaneously, and yet lend itself readily to the undulations of the road without imposing undue strain upon the mechanism. The strains imposed upon such a structure in proceeding over rough, uneven ground are entirely different from those imposed upon the ordinary vehicle gear, and new means are required to withstand them. For example, when the axles are thrown out of the same horizontal plane by one wheel running into a hollow in the road, the structure must be such as to permit, yet tend to correct, the resulting distortion, in order that undue weight may not be thrown upon the other wheels, while, at the same time, the engagement and relation between the different parts of the steering gear must be kept as positive and unbending as possible.

Innumerable designs for vehicle gear embodying the two turning axle principle have been suggested and have wholly failed. Excessive strain upon the king-bolt and lost motion in the gearing soon result in wabbling and zigzagging together with a general loosening up of the apparatus which renders it entirely impracticable.

I have found, therefore, that it is essential to a successful short turn gear that it be so constructed as to assure positive engagement between the moving parts of the steering gear, ample support and positive centering of the axle pivots, and yet afford a certain flexibility between the axles, so as to avoid undue strain when the vehicle is passing over uneven ground. This combination of flexibility and inflexibility, which is the chief object of my present invention, has not been appreciated or satisfactorily incorporated in short turn vehicles of the prior art.

Further objects and advantages of my invention will appear from the following detailed description, taken in connection with the annexed drawings, in which like characters refer to like parts.

Figure 1 is a longitudinal section of one form of apparatus embodying my invention, the body and wheels of the vehicle being omitted for clearness in illustration. It is understood that members A and B represent the front and rear axles of the vehicle, respectively, and members C and D the front and rear bolsters upon which the frame is mounted.

Fig. 2 is a view of the under side of the device shown in Fig. 1.

Fig. 3 is a cross-section of the same on line 3—3 of Fig. 1.

Fig. 4 is a detail view of the under surface of bearing plate 12 (Fig. 1).

Fig. 5 is a detail view of the upper surface of fifth wheel 1, which engages therewith; and Fig. 6 is an end view of the device shown in Fig. 1 on the line 6—6.

Referring to Figs. 1 to 6, inclusive, in which I have illustrated a preferred form of construction embodying my invention, the fifth wheel 1, which is mounted upon the front axle A and bolted securely thereto by means of bolts 2 through the extension bosses 3 or by clip-bolts 4 fitted around the cross-arm 5, is made up of a plurality of circular bearing surfaces, such as the rings 7 and 8, connected together and secured to the axle by the cross-arm 5. This arm is preferably provided with shoulders 9 to prevent excessive rotation of the axle, as will be hereafter more fully described. The outer ring 7 carries upon its lower face the sector of a rack 10 adapted to engage the pinion 11. The front bolster C of the vehicle rests upon a bearing plate 12, which is accurately machined to fit the fifth wheel 1, and for that purpose is provided with broad rings 13 and 14, in which may be cut the annular recesses 15 and 16, corresponding to, and fitting over, the rings 7 and 8. The cross-arms 17 and 18 of this bearing plate are made integral with the rings 13 and 14, and the longitudinal cross-arm 17 extends beyond the ring 13 in the direction of the rear axle, this portion 19 of its length being heavily built and preferably formed in I-beam section.

The reach 20, extending from the front to the rear axle of the vehicle, fulfils a very important function, in that it must hold the steering mechanisms in rigid engagement at the same time that it permits, while tending to correct, any distortion of the running gear due to use on rough ground. To fulfil this double function, I have first provided a very strong and positive mounting for the gears by which the steering is effected, in order that the distortion of the rest of the structure may have the minimum of effect there, and I have then lined the reach with strips of spring steel 20ª to give it resiliency and allow a proper amount of tipping by each axle relatively to the other. The reach 20, with its reinforcing strips of steel 20ª, is made to fit tightly in the upper channel of the cross-arm 17; ears or bosses 30 and 31 on opposite sides of the extension arm 19 coöperate with the clip 32 and corresponding bosses on the hanger 21 to bolt and clamp the reach 20 and the hanger 21 into the upper and lower channels, respectively, of the arm 19. The hanger 21 acts as a bearing and support for the shaft 22, and is placed as close to the ring 13 as possible, in order that the pinion 11, attached to the end of shaft 22, may be rigidly supported at the very smallest practicable distance from the rack 10 with which it engages. Shims 33 may be placed between the arm 19 and the hanger 21 to permit of vertical adjustment thereof, and the grease cup 34 and duct 35 may be formed in the upper portion of the hanger for the purpose of lubricating the bearing.

On the lower face of bearing plate 12, and preferably on the lower face of cross-arm 17, are three or more bosses 23, 24 and 25, located close to the annular recesses 15 and 16. L bolts 26, 27 and 28 may be passed through suitable holes in these bosses, their toe bars 29, 30 and 31 extending under the rings of the fifth wheel, so that the fifth wheel and bearing plate may be kept together by this means and the desired friction contact between the two obtained without the use of a king-bolt. The bosses 24 and 25, being in the path of rotation of the shoulders 9, will act as stops when the axle has turned as far as desired. The bolts 26, 27 and 28 may also be used for securing the bearing plate to the reach and to the bolster C, or any other suitable means for fastening the bearing plate to the frame may be employed.

A king-bolt may, or may not, be used with this type of construction, as desired, but it is entirely unnecessary on account of the large bearing surface, the fitted rings and recesses and the ample support provided by the L bolts and the pinion 11 under the rack 10. Such an arrangement insures much greater strength and longer life to the apparatus, and makes vehicles equipped with my short-turn-gear adaptable to conditions and circumstances in which they have been impracticable before. On the other hand, if a king-bolt is employed to keep the fifth wheel 1 and bearing plate 12 in the desired pivotal contact, the rings and recesses 7, 8, and 15, 16, may be discarded and flat bearing surfaces used in their stead. I have described them merely as a preferred form to be used in connection with my improved steering and supporting gear, and do not intend to limit myself to this detail of construction.

It will be understood that in describing the fifth wheel and its appurtenant mechanism I have in mind that the same or similar devices are to be applied in the form of a sixth wheel to the rear axle. However, a description of one will suffice for both, and it will be clear that when the axle A is turned in one direction about its pivot point the shaft 23 will be caused to revolve by operation of the rack 10 on pinion 11 and will force the rear axle B to turn around its pivot point through an equal angle in the opposite direction.

While I have described my invention in great detail in what I consider to be its preferred embodiment, it will be apparent to those skilled in the art that numerous changes and substitutions of parts may be made without departing from the spirit of my invention, which I intend shall be limited and defined only by the scope of the appended claims.

Having described my invention, what I claim as new and desire to secure by Letters Patent is:—

1. In apparatus of the character described, the combination with the front and rear axles, of a fifth wheel on the front axle, a sixth wheel on the rear axle, racks on said wheels, a shaft having pinions to engage said racks, bearing plates for said fifth and sixth wheels secured to the body of the vehicle, a reach supported on arms integral with the plates, and hangers engaging the shaft adjacent said pinions and fitted into and supported by the said arms.

2. In apparatus of the character described, the combination with the front and rear axles, of a fifth wheel on the front axle, a sixth wheel on the rear axle, racks on said wheels, a shaft having pinions to engage said racks, bearing plates for said fifth and sixth wheels secured to the body of the vehicle, a resilient reach supported on arms integral with the plates and hangers engaging the shaft adjacent said pinions and fitted into and supported by the said arms.

3. In apparatus of the character described, the combination with the front and rear axles, of a fifth wheel on the front axle, a sixth wheel on the rear axle, racks on said wheels, a shaft having pinions to engage said racks, bearing plates for said fifth and sixth wheels secured to the body of the vehicle, a reach comprising a wooden bar reinforced with spring steel, hangers engaging the shaft close to the pinions, the said reach and hangers being rigidly clamped to the said plates.

4. In apparatus of the character described, the combination with the front and rear axles, of a fifth wheel on the front axle, a sixth wheel on the rear axle, racks on said wheels, a shaft having pinions to engage said racks, bearing plates for said fifth and sixth wheels secured to the body of the vehicle, a reach supported on arms integral with the plates, hangers engaging the shaft adjacent said pinions and fitted into and supported by the said arms, the said arms being flanged to fit the reach and hangers, and means for clamping the reach and hangers adjustably to the said arms.

5. In apparatus of the character described, the combination with the front and rear axles, of a fifth wheel on the front axle, a sixth wheel on the rear axle, racks on said wheels, a shaft having pinions to engage said racks, bearing plates for said fifth and sixth wheels secured to the body of the vehicle, a reach supported on arms integral with the plates, hangers engaging the shaft close to the pinions, the said arms being of I-beam section adapted to take the reach in the upper channels and the hangers in the lower channels, and means for clamping the reach and hangers rigidly to the said arms.

6. In apparatus of the character described, the combination of front and rear axles, a fifth wheel on the front axle, a sixth wheel on the rear axle, concentric rings on the upper faces of the said wheels, racks on the lower faces thereof, a shaft having pinions to engage said racks, bearing plates secured to the body structure of the vehicle having concentric surfaces adapted to engage and fit the said rings, a reach rigidly secured to the plates, and hangers engaging the shaft close to the pinions and fitted into and supported by the said bearing plates.

7. In apparatus of the character described, in combination with the front and rear axles, of a fifth wheel on the front axle, a sixth wheel on the rear axle, racks on said wheels, a shaft having pinions to engage said racks, bearing plates for said fifth and sixth wheels secured to the body structure of the vehicle, concentric raised portions on the upper surface of said wheels, corresponding depressed portions on the lower surface of said plates, means for holding the wheels in friction contact with the plates respectively, a resilient reach supported on arms integral with the plates, and hangers engaging the shaft close to the pinions, the said reach and hangers being rigidly clamped to the said arms.

8. In apparatus of the character described, in combination with the front and rear axles, of a fifth wheel on the front axle, a sixth wheel on the rear axle, racks on said wheels, a shaft having pinions to engage said racks, bearing plates for said fifth and sixth wheels secured to the body of the vehicle, concentric raised portions on the upper surface of said wheels, corresponding depressed portions on the lower surface of said plates, means, not comprising a king-bolt, for holding the wheels in adjustable friction contact with the plates respectively, a resilient reach supported on arms integral with the plates, and hangers engaging the shaft adjacent said pinions and fitted into and supported by the said arms.

9. In apparatus of the character described, the combination with a vehicle having automatic mechanism for turning its axles oppositely and simultaneously, of a fifth wheel on the front axle, a sixth wheel on the rear axle, bearing plates for said fifth and sixth wheels attached to the body of the vehicle, a resilient reach, and means for supporting the reach and the said automatic mechanism rigidly on the bearing plates.

10. In apparatus of the character described, the combination with a vehicle having automatic mechanism for turning its axles oppositely and simultaneously, of a fifth wheel on the front axle, a sixth wheel on the rear axle, bearing plates for said fifth and sixth wheels attached to the body of the vehicle, means not comprising a king-bolt for keeping the wheels and plates in the desired friction and pivotal contact, a reach comprising a wooden bar resiliently reinforced, and means for securing the reach and the said automatic mechanism rigidly to each other and to the bearing plates.

11. In apparatus of the character described, the combination with a vehicle having automatic mechanism for turning its axles oppositely and simultaneously, of a fifth wheel on the front axle, a sixth wheel on the rear axle, bearing plates for said fifth and sixth wheels attached to the body of the vehicle and having longitudinal arms of I-beam section adapted to take a reach in the upper channels and supports for the said automatic mechanism in the lower channels, and means for clamping the said reach and supports rigidly to the said arms.

12. In apparatus of the characer described, the combination with a vehicle having automatic mechanism for turning its axles oppositely and simultaneously, of a fifth wheel on the front axle, a sixth wheel on the rear axle, bearing plates for said fifth and sixth wheels attached to the body of the vehicle and having longitudinally flanged arms, the upper channels formed by such flanges being adapted to engage a resilient reach and the lower channels to engage supports for the said automatic mechanism.

13. In apparatus of the character described, the combination with a vehicle having automatic mechanism for turning its axles oppositely and simultaneously, of a fifth wheel on the front axle, a sixth wheel on the rear axle, bearing plates for said fifth and sixth wheels attached to the body of the vehicle and having longitudinally flanged arms, the upper channels formed by such flanges being adapted to engage a resilient reach and the lower channels to engage supports for the said automatic mechanism, the said reach and supports being rigidly clamped to the said arms close to the said bearing plates.

In testimony whereof I have signed my name to this specification.

JOHN M. EADIE.

Copies of this patent may be obtained for five cents each, by addressing the "Commissioner of Patents, Washington, D. C."